US009117405B2

(12) United States Patent
Kim et al.

(10) Patent No.: US 9,117,405 B2
(45) Date of Patent: Aug. 25, 2015

(54) ORGANIC LIGHT EMITTING DEVICE

(71) Applicant: Samsung Display Co., Ltd., Yongin, Gyeonggi-Do (KR)

(72) Inventors: Bo-Yeon Kim, Seoul (KR); Oh-Jo Kwon, Suwon-si (KR); Won-Tae Choi, Hwaseong-si (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 179 days.

(21) Appl. No.: 13/669,063

(22) Filed: Nov. 5, 2012

(65) Prior Publication Data

US 2013/0342519 A1 Dec. 26, 2013

(30) Foreign Application Priority Data

Jun. 22, 2012 (KR) ........................ 10-2012-0067519

(51) Int. Cl.

*G09G 3/30* (2006.01)
*G06F 3/038* (2013.01)
*G09G 3/32* (2006.01)

(52) U.S. Cl.

CPC ...... *G09G 3/3225* (2013.01); *G09G 2320/0626* (2013.01); *G09G 2330/021* (2013.01); *G09G 2360/16* (2013.01)

(58) Field of Classification Search

CPC . G09G 3/3208; G09G 3/3233; G09G 3/3258; G09G 3/3225; G09G 2320/0626; G09G 2330/021; G09G 2360/16

USPC ...................... 345/76–84, 204, 211–213, 690

See application file for complete search history.

(56) References Cited

U.S. PATENT DOCUMENTS

2002/0125831 A1* 9/2002 Inukai et al. ............... 315/169.3
2002/0195968 A1* 12/2002 Sanford et al. ............. 315/169.3
2004/0263445 A1* 12/2004 Inukai et al. .................... 345/82
2006/0164369 A1* 7/2006 Park ................................ 345/98
2009/0147032 A1* 6/2009 Kim ............................. 345/690
2009/0167649 A1* 7/2009 Ishizuka ......................... 345/80
2009/0195484 A1* 8/2009 Lee et al. ........................ 345/76

FOREIGN PATENT DOCUMENTS

KR 10-2008-0057434 6/2008
KR 10-0876276 12/2008
KR 10-2011-0012274 2/2011
KR 10-2011-0095592 8/2011

* cited by examiner

*Primary Examiner* — Rodney Amadiz
(74) *Attorney, Agent, or Firm* — Robert E. Bushnell, Esq.

(57) ABSTRACT

An organic light emitting device is provided. The organic light emitting device includes an organic light emitting panel, a drive unit receiving image data and image luminance discrimination signal that includes information on a maximum luminance of the image and providing a data voltage corresponding to the image luminance discrimination signal to the organic light emitting panel, and a power supply unit providing a common voltage to the organic light emitting panel. The common voltage is varied to correspond to the image luminance discrimination signal.

18 Claims, 5 Drawing Sheets

ORGANIC LIGHT EMITTING DEVICE

CLAIM OF PRIORITY

This application makes reference to, incorporates the same herein, and claims all benefits accruing under 35 U.S.C. §119 from an application earlier filed in the Korean Intellectual Property Office on 22 Jun. 2012 and there duly assigned Serial No. 10-2012-0067519.

BACKGROUND OF THE INVENTION

1. Field of the Invention

An embodiment of the present invention relates to an organic light emitting device, and more particularly, to an organic light emitting device which may reduce power consumption.

2. Description of the Prior Art

In accordance with the trend of lightweight and thin-thickness of not only home display devices such as TVs and monitors but also portable display devices such as notebook computers, cellular phones, and PMPs, various display devices have been widely used. There are various types of flat display devices, such as liquid crystal display devices, organic light emitting devices, and electrophoretic display devices. Since the organic light emitting devices, among the flat display devices, have lower power consumption, higher luminance and higher contrast, and facilitate implementation of flexible displays, there has been an increasing demand for the organic light emitting devices.

The organic light emitting device displays an image by using organic light emitting diodes (OLED) as light emitting elements. The organic light emitting device emits light with a luminance level that corresponds to an electric current flowing through the organic light emitting device. The organic light emitting device includes a plurality of organic light emitting diodes, and grayscales of the organic light emitting diodes are controlled by the electric current flowing through the organic light emitting diodes to display the image. The organic light emitting device may include thin film transistors in order to control the current flowing through the respective organic light emitting diodes.

As the organic light emitting device is used in the portable display device, there is a need for the organic light emitting device that may reduce power consumption to increase a battery run-time.

SUMMARY OF THE INVENTION

In order to solve the above-mentioned problems, one aspect of the present invention provides an organic light emitting device which may reduce power consumption.

Another aspect of the present invention provides an organic light emitting device which may maintain good display quality while reducing the power consumption.

Additional advantages, aspects, and features of the present invention will be set forth in part in the description which follows and in part will become apparent to those having ordinary skill in the art upon examination of the following or may be learned from practice of the invention.

In accordance with one embodiment of the present invention an organic light emitting device may include an organic light emitting panel displaying an image, a drive unit receiving image data corresponding to the image and providing a data voltage corresponding to the image data to the organic light emitting panel, and a power supply unit providing a common voltage to the organic light emitting panel. The common voltage is varied to correspond to a maximum luminance of the image.

In accordance with another embodiment of the present invention, an organic light emitting device may include an organic light emitting panel, a drive unit receiving image data and image luminance discrimination signal that includes information on a maximum luminance of the image and providing a data voltage corresponding to the image luminance discrimination signal to the organic light emitting panel, and a power supply unit providing a common voltage to the organic light emitting panel. The common voltage is varied to correspond to the image luminance discrimination signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that when a layer is referred to as being on another layer or substrate, it can be directly on the other layer or substrate, or intervening layers may also be present. In contrast, when an element is referred to as being "directly on" another element, there are no intervening elements present.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, preferred embodiments of the present invention will be described in detail with reference to the accompanying drawings.

Figure 1:
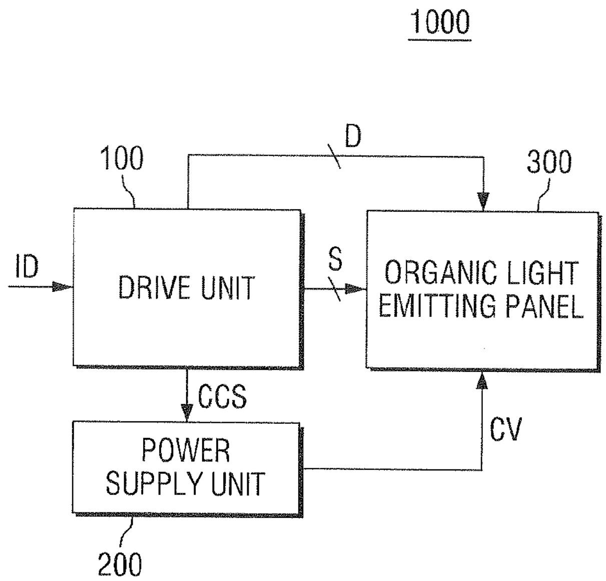
FIG. 1 is a block diagram of an organic light emitting device constructed with the principle of an embodiment of the present invention.

FIG. 1 is a block diagram of an organic light emitting device constructed with the principle of an embodiment of the present invention.

In reference to FIG. 1, the organic light emitting device 1000 constructed with the principle of an embodiment of the present invention includes a drive unit 100, a power supply unit 200, and an organic light emitting panel 300.

The drive unit 100 may receive image data ID and detect information on the luminance of an image that corresponds to the image data ID. In particular, the drive unit 100 may detect information on the maximum luminance of the image. The maximum luminance of the image may be the luminance of a pixel having the highest luminance among a plurality of pixels included in the image.

The drive unit 100 may generate a data voltage D, a scan signal S, and a common voltage control signal CCS.

The data voltage D may include information on grayscales of the image. The data voltage D may include first to n-th data voltages (where, n is an integer that is equal to or larger than 1). The level of the data voltage D may be varied according to the maximum luminance of the image. That is, the data voltage D that corresponds to the same grayscale may differ according to the maximum luminance of the image. For example, if the maximum luminance of the image increases, the level of the data voltage D may increase, while if the maximum luminance of the image decreases, the level of the data voltage D may decrease.

The scan signal S may include first to m-th scan signals (where, m is an integer that is equal to or larger than 1). The scan signal may control whether a plurality of pixels included in the organic light emitting panel 300 can display the image corresponding to the data voltage D.

The common voltage control signal CCS may be provided to the power supply unit 200 so as to control the level of the common voltage CV that is generated by the power supply unit 200. The common voltage control signal CCS may include information on the maximum luminance of the image.

Figure 2:
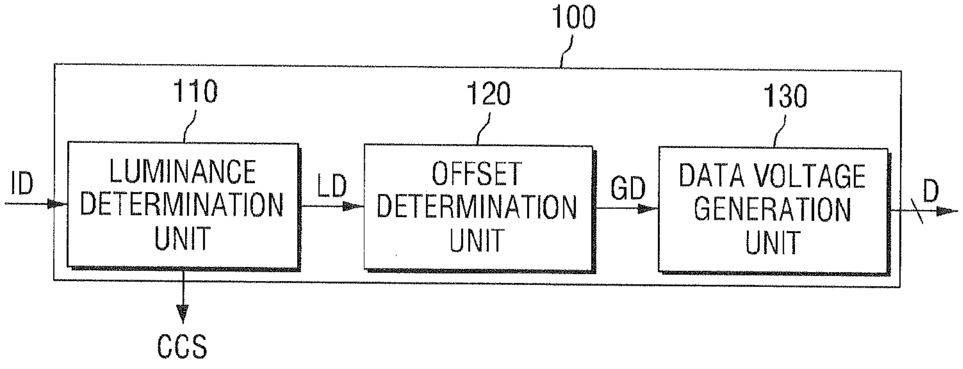
FIG. 2 is a block diagram of a drive unit constructed with the principle of an embodiment of the present invention.

Hereinafter, in reference to FIG. 2, the drive unit 100 will be described in more detail. FIG. 2 is a block diagram of a drive unit constructed with the principle of an embodiment of the present invention.

The drive unit 100 may include a luminance determination unit 110, an offset determination unit 120, and a data voltage generation unit 130.

The luminance determination unit 110 may receive the image data ID and detect the information on the maximum luminance of the image from the image data ID. The luminance determination unit 110 may generate luminance data LD and the common voltage control signal CCS that includes the information on the maximum luminance of the image.

The offset determination unit 120 may determine an offset voltage of the data voltage D from the luminance data LD. The level of the data voltage D may be varied as much as the offset voltage. For example, if the maximum luminance of the image increases, the offset voltage may increase, while if the maximum luminance of the image decreases, the offset voltage may decrease. The shift of the offset voltage may be performed at the same level as the shift of the common voltage CV. The offset determination unit 120 may generate grayscale data GD of the image that reflects the offset voltage corresponding to the maximum luminance.

The data voltage generation unit 130 may receive the grayscale data GD and output the data voltage D corresponding to the grayscale data GD. The level of the data voltage D that corresponds to the same grayscale may be changed to correspond to the change of the offset voltage. The amount of change of the offset voltage may be the same as the amount of change of the level of the data voltage D that corresponds to a constant grayscale. The shift of the data voltage D that corresponds to the constant grayscale may be performed in mutual synchronization with the shift of the common voltage CV at the same level. That is, if the difference between the data voltage D and the common voltage CV is constant although the data voltage D is varied, the organic light emitting panel 300 can display the image having the same grayscale.

In reference again to FIG. 1, the power supply unit 200 receives the common voltage control signal CCS and generates the common voltage CV. The common voltage CV may be a voltage that is commonly applied to a plurality of pixels included in the organic light emitting panel 300. The common voltage CV may be varied to correspond to the maximum luminance of the image. The shift of the common voltage CV may be performed in mutual synchronization with the shift of the data voltage D that corresponds to the constant grayscale at the same level.

Figure 3:
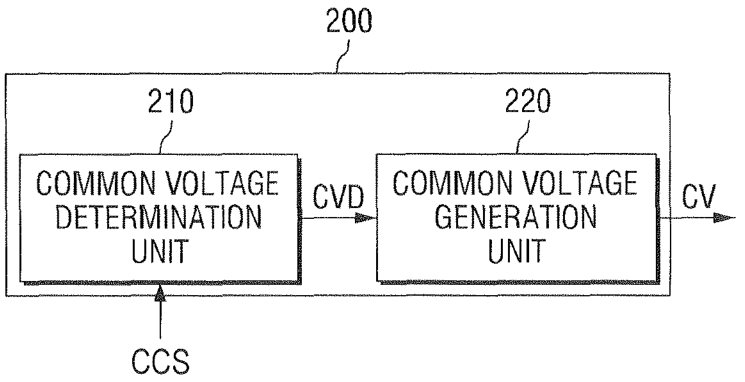
FIG. 3 is a block diagram of a power supply unit constructed with the principle of an embodiment of the present invention.

Hereinafter, in reference to FIG. 3, the power supply unit 200 constructed with the principle of an embodiment of the present invention will be described in more detail. FIG. 3 is a block diagram of a power supply unit constructed with the principle of an embodiment of the present invention.

In reference to FIG. 3, the power supply unit 200 may include a common voltage determination unit 210 and a common voltage generation unit 220.

The common voltage determination unit 210 may receive the common voltage control signal CCS and generate common voltage data CVD. The common voltage determination unit 210 may generate the common voltage data CVD to correspond to the maximum luminance of the image. The common voltage data CVD may be data for controlling the level of the common voltage CV that is generated by the common voltage generation unit 220. For example, the common voltage data CVD may be controlled in a manner that if the maximum luminance of the image increases, the common voltage CV increases, while if the maximum luminance of the image decreases, the common voltage CV decreases. The common voltage data CVD may be controlled so that the shift of the common voltage CV is performed in mutual synchronization with the shift of the data voltage D that corresponds to the constant grayscale at the same level.

The common voltage generation unit 220 may receive the common voltage data CVD and generate the common voltage CV corresponding to the common voltage data CVD. According to some embodiments, the common voltage generation unit may be configured by a DC/DC converter.

Figure 4:
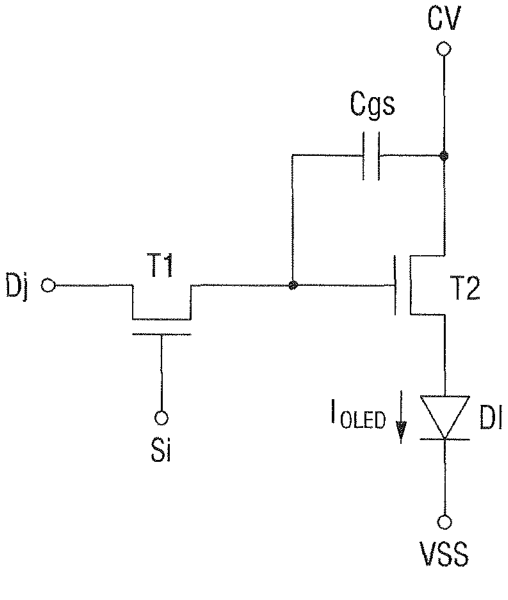
FIG. 4 is a circuit diagram of a pixel constructed with the principle of an embodiment of the present invention.

In reference to FIG. 1, the organic light emitting panel 300 may receive the data voltage D, the scan signal S, and the common voltage CV, and display the corresponding image. The organic light emitting panel 300 includes a plurality of pixels, and grayscales of the respective pixels may be controlled by the data voltage D, the scan signal S, and the common voltage CV. Hereinafter, in reference to FIG. 4, the operation of the pixels of the organic light emitting panel 300 will be described in more detail. FIG. 4 is a circuit diagram of a pixel constructed with the principle of an embodiment of the present invention.

A pixel may include a first transistor T1, a second transistor T2, a capacitor Cgs, and an organic light emitting diode D1.

The i-th scan signal Si may be applied to the gate of the first transistor T1 and control whether the first transistor T1 transfers the j-th data voltage Dj to the gate of the second transistor T2 (where, i is an integer that is equal to or larger than 1 and equal to or smaller than m, and j is an integer that is equal to or larger than 1 and equal to or smaller than n). If the j-th data voltage Dj is transferred to the gate of the second transistor T2, current $I_{OLED}$ flows to the organic light emitting diode DI to correspond to the voltage that is charged between the gate and the source of the second transistor T2 by the capacitor Cgs. The organic light emitting diode DI emits light to correspond to the current $I_{OLED}$ that flows to the organic light emitting diode DI. Since the voltage charged between the gate and the source of the second transistor T2 is the same as the difference between the common voltage CV and the j-th data voltage Dj, the organic light emitting diode DI emits light to correspond to the difference between the common voltage CV and the j-th data voltage Dj. Accordingly, if the difference between the common voltage CV and the j-th data voltage Dj is maintained constant, the organic light emitting diode DI emits light with a constant luminance regardless of the values of the common voltage CV and the j-th data voltage Dj. Since the power consumption is determined by the product of current and voltage, the power consumption of the organic light emitting diode DI may be indicated by the product of common voltage CV and current $I_{OLED}$. If the maximum luminance of the image decreases, the common voltage CV is lowered, and thus the power consumption of the organic light emitting device 1000 can be reduced.

Figure 5:
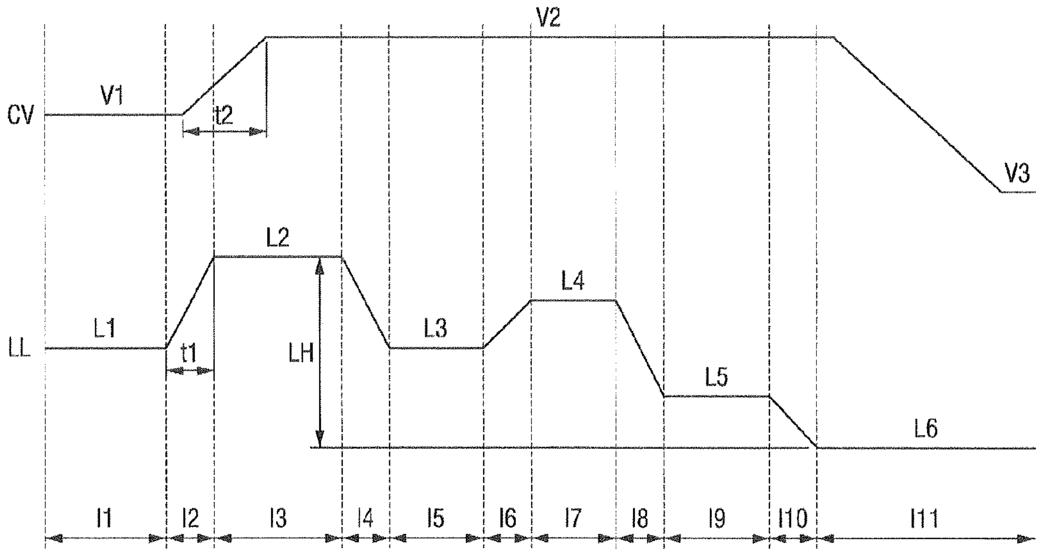
FIG. 5 is a graph illustrating the maximum luminance and a common voltage according to an embodiment of the present invention.

Hereinafter, in reference to FIG. 5, the relationship between the maximum luminance of the image and the common voltage will be described in more detail. FIG. 5 is a graph illustrating the maximum luminance and the common voltage according to an embodiment of the present invention.

In reference to FIG. 5, the maximum luminance LL becomes a first luminance L1 in a first period I1. The maximum luminance LL may be changed to become a second luminance L2 that is higher than the first luminance L1 in a third period I3 through a second period I2 that is a shift period. If the maximum luminance LL is changed from the first luminance L1 to the second luminance L2, the common voltage CV may be shifted from a first voltage V1 corresponding to the first luminance L1 to a second voltage V2 corresponding to the second luminance L2. The time t2 in which the common voltage CV is shifted from the first voltage V1 to the second voltage V2 may be longer than the time t1 in which the maximum luminance LL is shifted from the first luminance L1 to the second luminance L2. If the common voltage CV is abruptly changed, noise may occur in the image that is displayed on the organic light emitting panel 300 or the grayscales may become abnormal to deteriorate the display quality. In this case, if the shift time of the common voltage CV is relatively lengthened, the deterioration of the display quality due to the abrupt change of the common voltage CV can be prevented. According to some embodiments, when the common voltage CV increases or decreases, the increasing speed or the decreasing speed may be maintained constant to the extent that it does not affect the display quality.

If the maximum luminance LL decreases with a decreasing width that is narrower than that of the hysteresis luminance LH, the common voltage CV is not changed. For example, even if the maximum luminance LL is shifted to the third luminance L3 through a fourth period 14 that is a shift period in a state where the maximum luminance LL becomes the second luminance L2 in the third period I3 and the common voltage CV becomes the second voltage V2 that corresponds to the second luminance L2, the common voltage CV may maintain the second luminance in the case where the difference between the second luminance L2 and the third luminance L3 is smaller than the hysteresis luminance LH. The hysteresis luminance LH is a predetermined value for configuring the common voltage CV. If at a certain time the value of the common voltage CV corresponds to the maximum luminance LL, the common voltage starts to drop when the maximum luminance becomes a lower luminance lower than the maximum luminance LL at the certain time.

If the common voltage CV becomes a voltage that corresponds to the luminance of the maximum luminance LL and thereafter the maximum luminance LL is changed within the range of hysteresis luminance LH, the common voltage CV is not changed. For example, as shown in FIG. 5, even if the maximum luminance LL decreases from the second luminance L2 to the third luminance L3, increases from the third luminance L3 to the fourth luminance L4, and decreases from the fourth luminance L4 to the fifth luminance L5, the third to fifth luminances L3, L4, and L5 are present between the second luminance L2 and a luminance obtained by subtracting the hysteresis luminance LH from the second luminance L2. Accordingly, the common voltage CV is not changed from the second voltage V2 that corresponds to the second luminance L2. As a result, the organic light emitting device 100 can prevent the abrupt change of the common voltage CV, and thus the deterioration of the display quality due to the abrupt change of the common voltage CV can be prevented.

If the common voltage CV becomes a voltage that corresponds to the luminance of the maximum luminance LL and thereafter the maximum luminance LL is changed outside the range of the hysteresis luminance LH, the common voltage CV may be changed. For example, as shown in FIG. 5, if the maximum luminance LL is changed from the second luminance L2 to the sixth luminance L6 that is lower than the second luminance L2 as much as the hysteresis luminance LH, the common voltage CV may be changed from the second voltage L2 corresponding to the second luminance L2 to the third voltage V3 corresponding to the sixth luminance L6. The time point where the second voltage V2 starts to shift to the third voltage V3 may follow the time point where the maximum luminance LL reaches the sixth luminance. In an embodiment where the common voltage CV has been changed to correspond to a change of the maximum luminance LL for at least one time, the common voltage CV is not changed when the maximum luminance LL is changed within the range of the hysteresis luminance LH, and the common voltage CV is changed only when the maximum luminance LL is changed outside the range of the hysteresis luminance LH.

Even not shown in the drawings, it should be understood that in the case where the sixth luminance L6 is higher than the second luminance L2 and the maximum luminance LL increases and decreases several times between the higher sixth luminance L6 and the second luminance L2 within the range of the hysteresis luminance LH, the common voltage CV is unchanged. When the maximum luminance LL eventually increases outside the range of the hysteresis luminance LH, the common voltage CV is changed to a voltage V4 corresponding to the higher sixth luminance L6.

Figure 6:
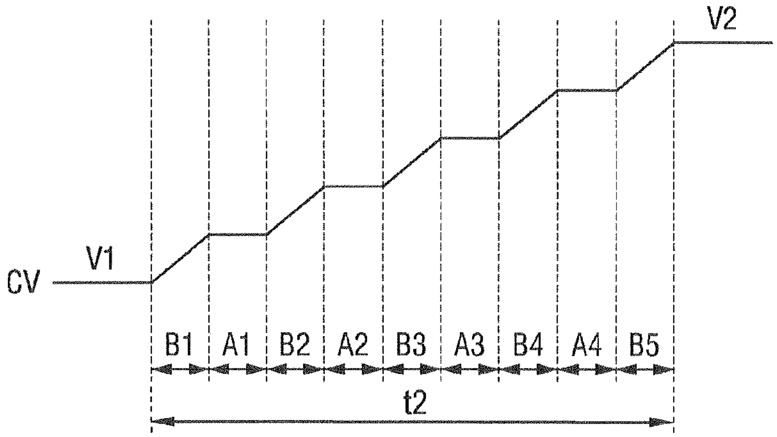
FIG. 6 is a graph illustrating a common voltage according to another embodiment of the present invention.

Hereinafter, in reference to FIG. 6, the common voltage CV according to another embodiment of the present invention will be described. FIG. 6 illustrates the common voltage according to another embodiment of the present invention.

The time period t2 in which the common voltage CV is shifted from the first voltage V1 to the second voltage V2 may include first to fourth maintenance periods A1, A2, . . . , and A4 and first to fifth change period B1, B2, . . . , and B5. The number of maintenance periods and the number of change periods may be changed according to the embodiment or the difference between the first voltage V1 and the second voltage V2.

In the first to fourth maintenance periods A1, A2, . . . , and A4, the voltage level may be maintained constant. In the first to fifth change periods B1, B2, . . . , and B5, the voltage increasing slopes may be the same.

The first to fifth change periods B1, B2, . . . , and B5 and the first to fourth maintenance periods A1, A2, . . . , and A4 may be arranged to cross each other. The lengths of the first to fourth maintenance periods A1, A2, . . . , and A4 and the first to fifth change periods B1, B2, . . . , and B5 may be the same as the length of a unit frame of an image displayed on the organic light emitting panel 300. In the first to fourth maintenance periods A1, A2, . . . , and A4, it may be determined whether to increase or decrease the voltage in the following change periods through prediction of the maximum luminance of the image in the frame unit. Accordingly, in the organic light emitting device 1000, since the common voltage CV can promptly react on the luminance change of the image and the common voltage CV is constantly maintained in the maintenance periods, the deterioration of the display quality due to the abrupt change of the common voltage CV can be prevented through lowering of the changing speed of the common voltage CV.

FIG. 6 illustrates only the case where the common voltage CV increases from the first voltage V1 to the second voltage V2. However, in the case where the common voltage CV decreases, substantially the same explanation as in FIG. 6 can be made.

Figure 7:
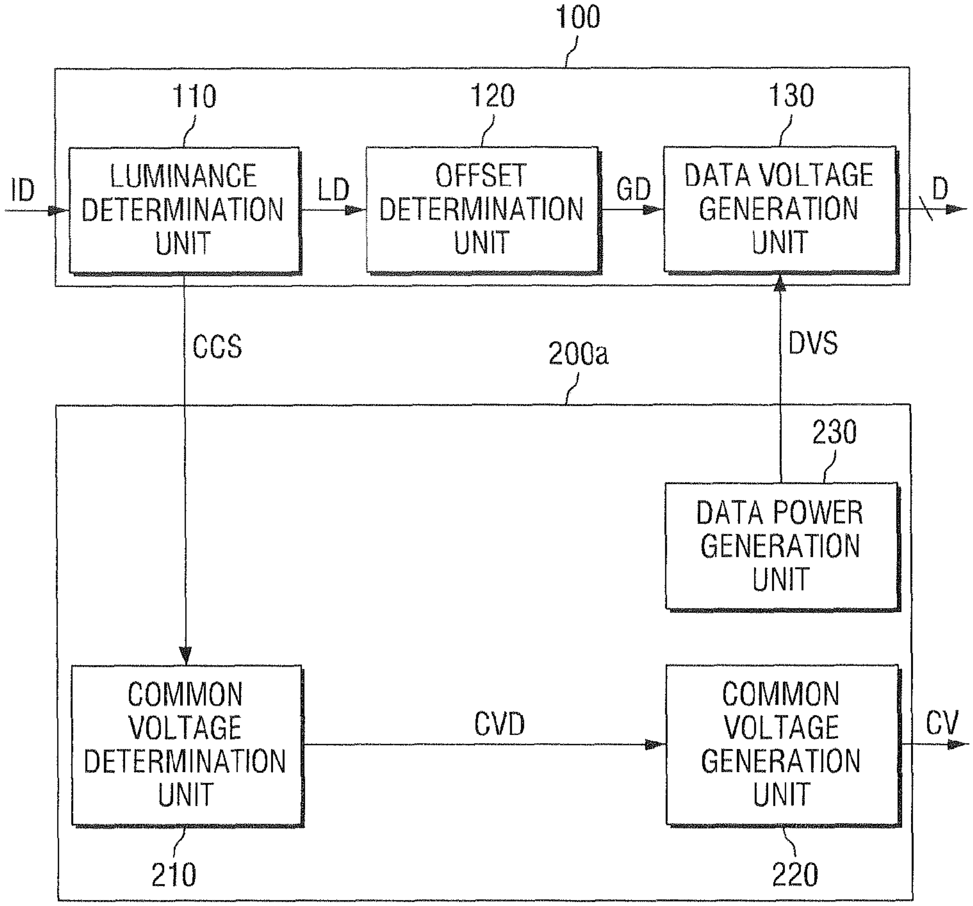
FIG. 7 is a block diagram of a drive unit and a power supply unit constructed with the principle of still another embodiment of the present invention.

Hereinafter, in reference to FIG. 7, a drive unit 100 and a power supply unit 200*a* constructed with the principle of still another embodiment of the present invention will be described. FIG. 7 is a block diagram of a drive unit and a power supply unit constructed with the principle of still another embodiment of the present invention.

In reference to FIG. 7, the power supply unit 200*a* may further include a data power generation unit 230 in comparison to the power supply unit 200 of FIG. 3. The data power generation unit 230 may supply the power DVS to the data voltage generation unit 130. If the data voltage generation unit 130 receives the power DVS from the data power generation unit 230 included in the power supply unit 200*a*, the synchronization between the data voltage D and the common voltage CV may be easily performed. According to some embodiments, the data power generation unit 230 may be composed of a DC/DC converter.

Figure 8:
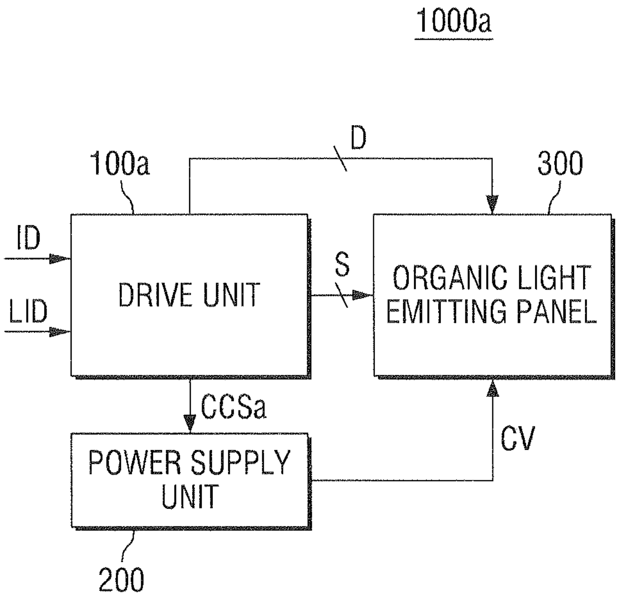
FIG. 8 is a block diagram of an organic light emitting device constructed with the principle of still another embodiment of the present invention.

Hereinafter, in reference to FIG. 8, the organic light emitting device constructed with the principle of still another embodiment of the present invention will be described. FIG. 8 is a block diagram of an organic light emitting device constructed with the principle of still another embodiment.

In reference to FIG. 8, the drive unit 100*a* may further receive an image luminance discrimination signal LID in addition to the image data ID. The image luminance discrimination signal LID is a signal related to the luminance of the image, and may include information on the maximum luminance of the image. The drive unit 100*a* may generate a common voltage control signal CCSa for controlling the power supply unit 200 so that the power supply unit 200 varies the common voltage CV to correspond to the image luminance discrimination signal LID. That is, the drive unit 100*a* of FIG. 8 does not detect the maximum luminance of the image from the image data ID, but receives the maximum luminance from the exterior and generates the data voltage D corresponding to the maximum luminance. In the case of a still image in which an image of a specified luminance continues, a booting image of the display device, or a finishing image, the organic light emitting device 1000*a* may receive the image luminance discrimination signal LID from the outside and easily generate the data voltage D corresponding to the maximum luminance of the image and the common voltage CV to reduce the power consumption.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An organic light emitting device, comprising:

an organic light emitting panel displaying an image;

a drive unit receiving image data corresponding to the image and providing a data voltage corresponding to the image data to the organic light emitting panel; and a power supply unit providing a common voltage to the organic light emitting panel, with the common voltage being varied to correspond to a maximum luminance of the image, wherein when the maximum luminance of the image is changed from a first luminance to a second luminance that is higher than the first luminance, the common voltage is changed from a first voltage that corresponds to the first luminance to a second voltage that corresponds to the second luminance, and wherein a time point where a shift from the first luminance to the second luminance completes is followed by a time point where a shift from the first voltage to the second voltage completes.

2. The organic light emitting device of claim 1, wherein if the common voltage is varied to correspond to the maximum luminance of the image, the data voltage is varied to correspond to the maximum luminance of the image, and if grayscales of the image are constant, a difference between the common voltage and the data voltage becomes constant.

3. The organic light emitting device of claim 1, wherein a time in which the common voltage is changed from the first voltage to the second voltage is longer than a time in which the maximum luminance is changed from the first luminance to the second luminance.

4. The organic light emitting device of claim 1, wherein if the maximum luminance of the image is changed from a third luminance to a fourth luminance, the common voltage is changed from a third voltage that corresponds to the third luminance to a fourth voltage that corresponds to the fourth luminance, and a time period in which the common voltage is shifted from the third voltage to the fourth voltage includes a maintenance period in which the common voltage is maintained and a change period in which the common voltage is changed.

5. The organic light emitting device of claim 4, wherein in the change period, the common voltage is a voltage between the third voltage and the fourth voltage.

6. The organic light emitting device of claim 4, wherein the maintenance period includes first to n-th maintenance periods arranged in a time order, the change period includes first to (n+1)-th change periods arrange in a time order, and the first to n-th maintenance periods and the first to (n+1)-th change periods are arranged to cross each other.

7. The organic light emitting device of claim 6, wherein each length of the first to n-th maintenance periods is the same as a length of a unit frame of the image that is displayed on the organic light emitting panel.

8. The organic light emitting device of claim 6, wherein each length of the first to (n+1)-th change periods is the same as a length of a unit frame of the image that is displayed on the organic light emitting panel.

9. The organic light emitting device of claim 1, wherein if the maximum luminance of the image is changed from a fifth luminance to a sixth luminance that is lower than the fifth luminance and a difference between the fifth luminance and the sixth luminance is smaller than a hysteresis luminance, the common voltage is not changed from a voltage that corresponds to the fifth luminance.

10. The organic light emitting device of claim 9, wherein if the maximum luminance of the image is changed from the fifth luminance to the sixth luminance and then is changed from the sixth luminance to a seventh luminance between the fifth luminance and the sixth luminance, the common voltage is not changed from the voltage that corresponds to the fifth luminance.

11. The organic light emitting device of claim 9, wherein if the maximum luminance of the image is changed from the fifth luminance to an eighth luminance that is lower than the fifth luminance and a difference between the fifth luminance and the eighth luminance is larger than the hysteresis luminance, the common voltage is shifted from a voltage that corresponds to the fifth luminance to a voltage that corresponds to the eighth luminance.

12. The organic light emitting device of claim 9, wherein if the maximum luminance of the image is changed in a period between the fifth luminance and a luminance that is lower than the fifth luminance as much as the hysteresis luminance, from the fifth luminance, the common voltage is not changed from a fifth voltage that corresponds to the fifth luminance.

13. The organic light emitting device of claim 1, wherein the drive unit comprises a luminance determination unit determining the maximum luminance of the image from the image data.

14. The organic light emitting device of claim 13, wherein the drive unit further comprises:

an offset determination unit determining an offset voltage of the data voltage from the maximum luminance; and a data voltage generation unit generating the data voltage of a level that corresponds to the offset voltage.

15. The organic light emitting device of claim 1, wherein the power supply unit comprises:

a common voltage determination unit determining a level of the common voltage to correspond to the maximum luminance of the image; and a common voltage generation unit generating the common voltage to correspond to the level of the common voltage.

16. The organic light emitting device of claim 15, wherein the power supply unit comprises a data power generation unit supplying power to the drive unit to obtain synchronization between the data voltage and the common voltage.

17. An organic light emitting device, comprising:

an organic light emitting panel displaying an image;

a drive unit receiving image data corresponding to the image and image luminance discrimination signal that includes information on a maximum luminance of the image and providing a data voltage corresponding to the image luminance discrimination signal to the organic light emitting panel; and a power supply unit providing a common voltage to the organic light emitting panel, with the common voltage being varied to correspond to the image luminance discrimination signal, wherein when the maximum luminance of the image is changed from a first luminance to a second luminance that is higher than the first luminance, the common voltage is changed from a first voltage that corresponds to the first luminance to a second voltage that corresponds to the second luminance, and wherein a time point where a shift from the first luminance to the second luminance completes is followed by a time point where a shift from the first voltage to the second voltage completes.

18. The organic light emitting device of claim 17, wherein if the common voltage is varied to correspond to the image luminance discrimination signal, the data voltage is also varied to correspond to the maximum luminance of the image, and if grayscales of the image are constant, a difference between the common voltage and the data voltage becomes constant.

* * * * *